United States Patent [19]
Carlson et al.

[11] 3,788,157
[45] Jan. 29, 1974

[54] TRANSMISSION SHIFTING APPARATUS

[75] Inventors: Paul E. Carlson, Williamsport; Ralph U. Schimmel, Hagerstown, both of Md.

[73] Assignee: Mack Trucks, Inc., Allentown, Pa.

[22] Filed: May 15, 1972

[21] Appl. No.: 253,492

[52] U.S. Cl................... 74/364, 192/98, 192/53 G
[51] Int. Cl...... F16h 3/08, F16d 11/04, F16d 23/12
[58] Field of Search...... 74/364, 462; 192/98, 53G, 192/110 B, 114 T

[56] References Cited
UNITED STATES PATENTS

| | | | |
|---|---|---|---|
| 2,692,511 | 10/1954 | Hallinger | 74/364 X |
| 2,406,417 | 8/1946 | Vivano | 74/364 X |
| 2,995,406 | 8/1961 | Pitner | 192/98 UX |
| 2,658,596 | 10/1953 | Archambault | 74/346 X |
| 2,022,034 | 11/1935 | Griswold | 192/53 G |
| 2,969,134 | 1/1961 | Wiedmann et al. | 192/98 X |
| 2,917,936 | 12/1959 | Fletcher | 74/364 X |
| 3,079,806 | 3/1963 | Jones | 192/98 X |

FOREIGN PATENTS OR APPLICATIONS

| | | | |
|---|---|---|---|
| 262,843 | 12/1926 | Great Britain | 192/98 |

*Primary Examiner*—Arthur T. McKeon
*Attorney, Agent, or Firm*—Brumbaugh, Graves, Donohue & Raymond

[57] ABSTRACT

Apparatus for clutching two rotatable elements together. The rotatable elements are mounted for rotation about respective axes and are selectively coupled together by a shifter clutch member. The clutch member is preferably splined to one rotatable element so as to rotate therewith and be axially movable in and out of clutching engagement. The other rotatable element and the clutch member are provided with teeth on their facing sides which may be engaged to couple this element with the clutch member and, in turn, couple the two rotatable elements together. According to the invention, the clutch member is provided with two continuous, spaced, lateral engaging surfaces extending generally perpendicular to its axis of rotation. These surfaces coact with corresponding mating surfaces of an axially movable shifting element, preferably through the intermediary of antifriction bearings. The shifting element is thus effective to apply an axial force to the clutch member to shift the clutch member by applying uniform pressure against one of the clutch member engaging surfaces.

11 Claims, 10 Drawing Figures

TRANSMISSION SHIFTING APPARATUS

BACKGROUND OF THE INVENTION

The present invention relates to automotive transmissions and, more particularly, to a novel and highly effective arrangement for shifting transmissions of the type adapted for use on large trucks and the like.

The transmission of an automotive vehicle, such as a truck, transmits torque from the engine to the drive wheels with a variable mechanical advantage or gear ratio. In the conventional arrangement, a manually shifted transmission is preceded in the power train by a friction clutch which is operative to disconnect the transmission from the engine whenever the transmission gear ratio is changed. In practice, the various gears of the transmission are shifted by manually applying a force to one of a plurality of shifter forks. Each fork extends into a circumferential groove in a collar of a rotatable and axially movable gear or shifter clutch and when shifted, is operative to move the respective gear or shifter clutch into or out of engagement.

Since in this arrangement the transmission is shifted only when the vehicle friction clutch is disengaged, relatively little lateral force is normally required to shift the axially movable gear or shifter clutch. The shifter fork, as its name implies, only partially surrounds the collar of the axially movable gear or shifter clutch, engaging opposite sides of the collar, and the fork is not provided with antifriction bearings on its lateral, collar-engaging surfaces.

Transmissions are also known which are capable of shifting without disengaging the vehicle friction clutch. For example, the United States Pat. No. 2,398,407 to Brownyer discloses a two speed rear axle for use in trucks which is operative to shift between high and low range, under the influence of air pressure, when the vehicle operator momentarily lifts his foot from the accelerator pedal. In this arrangement, an air-actuated piston applies a force to a pair of trunions disposed in an annular groove on opposite sides of a clutch collar to axially move the clutch collar between the high and low range shift positions.

The disadvantage of self-shifting transmissions of the type designed to shift without disengagement of the vehicle friction clutch lies in the difficulty of synchronizing the elements to be shifted into meshing engagement. Various complicated synchronizing devices have been developed in the art to force into synchronization the rotating teeth to be meshed or engaged under load. In the above-mentioned patent to Brownyer, such synchronizing devices are avoided by constructing the engaging teeth with smooth, parallel, abutting ends and properly restricted engaging clearances, so that the teeth are difficult to engage. In this arrangement, when the teeth of the shifter clutch are brought into engagement with the teeth with which they are to mesh, the teeth of the respective elements merely rub against each other and remain out of meshing engagement until their speeds are synchronized. At the moment of substantial synchronism the shifting force, which is continuously applied to the clutch collar by the pair of trunions on opposite sides thereof, causes the teeth to quickly mesh.

As may be expected, a shifting arrangement of the type disclosed in the patent to Brownyer undergoes considerable shock and stress. Notwithstanding the smooth abutting ends of the engaging teeth, the teeth cause the shifter clutch to vibrate whenever they rub against each other in an attempt to engage. As a result, the shifter clutch as well as the trunions which serve to apply the shifting force against the clutch collar are subject to excessive loading and wear.

SUMMARY OF THE INVENTION

It is an object of the present invention to provide an automotive transmission which may be shifted either manually or semi-automatically without disengaging the vehicle friction clutch.

It is a further object of the present invention to provide a transmission of the above-described type which does not require devices for synchronizing the rotatable elements to be engaged during shifting.

It is a further object of the present invention to provide a transmission of the above-described type in which the shifting operation may be effected with greater smoothness than has heretofore been possible with the shifting apparatus of the prior art.

It is a still further object of the present invention to provide a transmission of the above-described type in which the shifting operation may be effected with reduced loading on the force-applying parts as well as less wear and heat due to friction than has heretofore been possible with the shifting apparatus of the prior art.

These objects, as well as other objects which will become apparent in the discussion that follows, are achieved by providing shifting apparatus for clutching two rotatable elements together comprising a shifter clutch member preferably splined to one of the elements so as to rotate therewith and be axially movable in and out of clutching engagement, and an axially movable shifting element for shifting the clutch member. The other rotatable element and the clutch member are provided with cooperating teeth on their facing sides which may be engaged to couple this other rotatable element with the clutch member and, in turn, couple the two rotatable elements together. According to the invention, the clutch member is also provided with two continuous, spaced, lateral engaging surfaces extending generally perpendicular to its axis of rotation. These surfaces coact with corresponding mating surfaces of the axially movable shifting element, preferably through the intermediary of antifriction bearings. The shifting element is thus effective to apply an axial force to the clutch member to shift the clutch member while applying an equally distributed, minimum pressure against one of the clutch member engaging surfaces.

In a preferred embodiment of the present invention apparatus for clutching a gear to a shaft is employed to shift gears in a transmission having a plurality of gear ratios. In this embodiment the shifter clutch member is provided with teeth on its opposite lateral sides and is axially movable between a first terminal position in which its teeth on one side are in driving engagement with corresponding teeth of a first gear, and a second terminal position in which its teeth on the opposite side are in driving engagement with corresponding teeth of a second gear. In the position midway between the terminal positions the teeth on both sides of the clutch member are out of engagement.

Whereas, in the prior art, the shifter element or "fork" for this type of device makes contact with the shifter clutch member only at selected points or along a segment around the periphery of the clutch member collar, the shifter element employed with the present invention provides full circle contact with the lateral engaging surfaces of the shifter clutch member. This construction insures smooth application of force by the shifter element against the shifter clutch member, thus reducing wear and heat due to friction and reducing the unit pressure between the lateral mating surfaces. In addition, provision of the continuous surfaces permits the insertion of antifriction bearings such as needle roller bearings between the lateral mating surfaces without the need for additional parts such as washers or spacers.

The apparatus for clutching a gear to a shaft according to the present invention is particularly useful in transmissions designed for semi-automatic operation. When the shifter clutch member in such a transmission is to be shifted, the shifter element is placed under load by a pneumatic or hydraulic shifting mechanism. When the vehicle clutch is disengaged or the vehicle operator momentarily lifts his foot off the accelerator pedal, the shifter clutch member is moved axially until the face teeth on one side thereof come into contact with the face teeth of the gear with which it is to become engaged. So long as the clutch member and the gear rotate at different speeds, the face teeth on these two elements rub against each other without engaging. During this period, the full circle area of force application between the shifter element and the shifter clutch member is effective (1) to maintain a continuous, smooth pressure against the shifter clutch member notwithstanding vibration caused by the clashing teeth, (2) to reduce the unit pressure between the force-applying surfaces and (3) through the use of antifriction bearings, to reduce wear and heat due to friction. Thereafter, at the instant that the shifter clutch member and the gear rotate at substantially the same speed, the shifter element forces the teeth of the shifter clutch member into full engagement with the teeth of the gear.

DESCRIPTION OF THE PREFERRED EMBODIMENTS

The preferred embodiments of the present invention will now be described in connection with FIGS. 1–10 of the drawings. Like elements in FIGS. 1–10 are designated with identical reference numerals.

Figure 1:
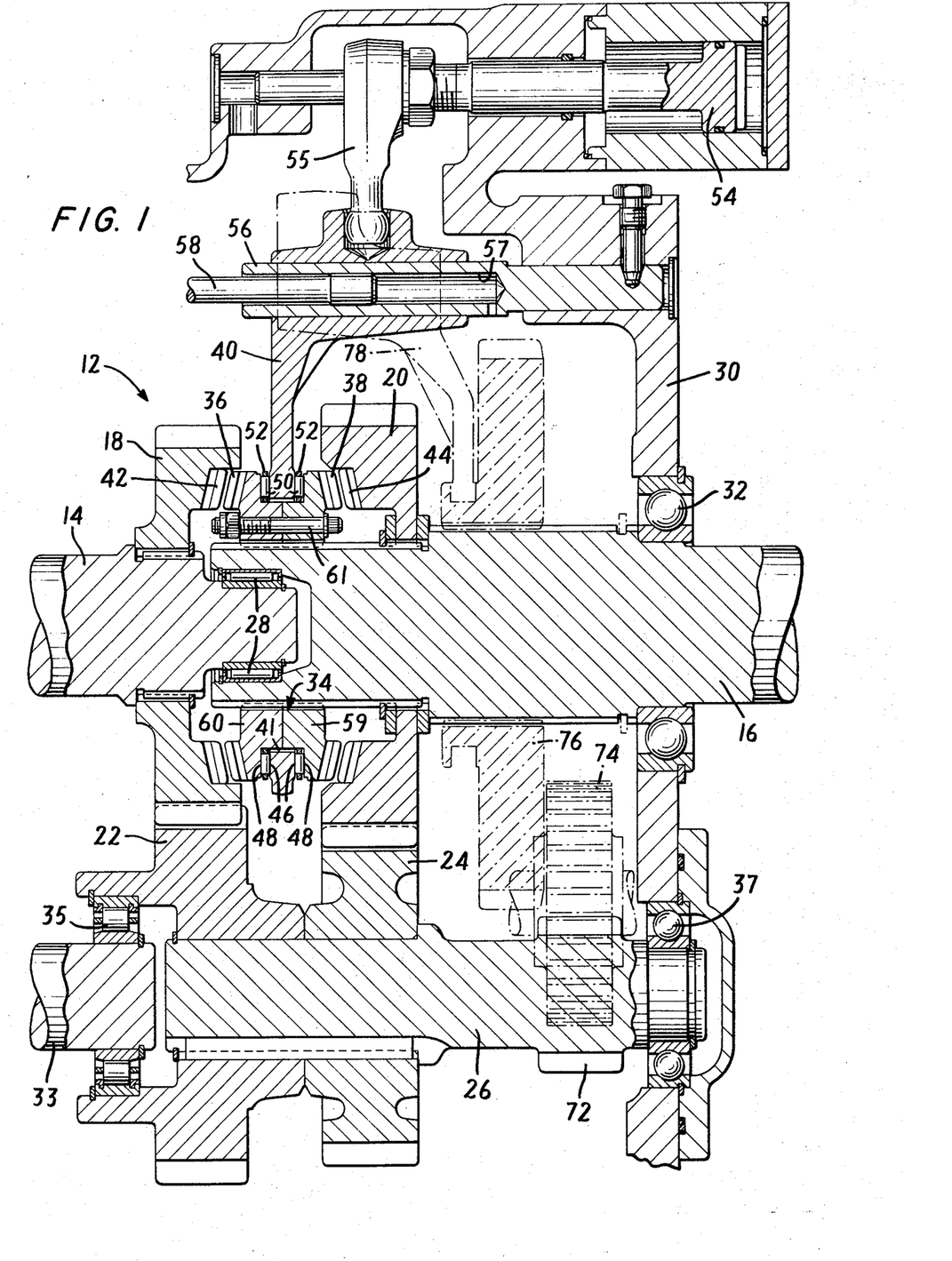
FIG. 1 is a sectional view of a portion of a transmission showing clutching apparatus according to a preferred embodiment of the present invention.

FIG. 1 illustrates a section of a vehicle transmission 12 designed to shift between high range (direct drive) and low range (gear reduction). This section is the final stage of a multi-speed transmission which may comprise any number of gear ratios each formed by a plurality of gears mounted on a main shaft and one or more countershafts. The section shown includes an input shaft 14 and an output shaft 16 on which are mounted spur gears 18 and 20, respectively. The gears 18 and 20 are in continuous mesh with spur gears 22 and 24, respectively, which are splined on a countershaft 26. The gear 18 is splined for rotation with the input shaft 14, while the gear 20 is mounted for free rotation about the output shaft 16.

The input shaft 14 forms the output shaft of the previous section of the transmission 12. This shaft is supported for rotation in the transmission housing and, for example, may be coupled to the vehicle engine through one or more other transmission sections and through a conventional vehicle clutch (not shown).

The output shaft 16 is rotatably supported at one end by the input shaft 14 on a plurality of needle roller bearings 28. The opposite end of the output shaft 16 is supported for rotation in the transmission housing 30 on a plurality of ball bearings 32.

The countershaft 26 is supported at one end by the gear 22 which, in turn, is supported by a countershaft 33 of the previous transmission section on a plurality of roller bearings 35. The countershaft 33 is mounted for rotation in the transmission housing and supports a plurality of gears in the conventional manner. The countershaft 26 is supported at its opposite end on a plurality of ball bearings 37 by the housing 30.

Preferably there are three countershafts 26 disposed symmetrically about the shaft 16, each countershaft carrying gears 22 and 24 in meshing engagement with the gears 18 and 20, respectively. Each countershaft 26 is supported for rotation at one end in the transmission housing and at the other end from the adjacent end of a corresponding one of three countershafts 33 disposed symmetrically about the shaft 14. For simplicity, only one countershaft 26 and associated elements are shown in FIG. 1.

A two-piece shifter clutch member 34, provided on its opposite sides with face teeth 36 and 38, is splined on the output shaft 16. This shifter clutch member is movable axially between the gears 18 and 20 by a shifter element 40, which is received in a groove 41 in the clutch member 34, as will be explained hereinafter.

The gears 18 and 20, which are arranged on a common axis with the shifter clutch member 34, are also provided with face teeth 42 and 44, respectively, in the sides thereof which face the clutch member. These teeth are designed to engage with the corresponding face teeth of the clutch member 34 under predetermined conditions, as will be explained hereinafter.

In operation, when the shifter clutch member 34 is moved to the left and its face teeth 36 are engaged with the face teeth 42 of the gear 18, the input shaft 14 is coupled directly to the output shaft 16. When the shifter clutch member 34 is moved to the right so that its face teeth 38 are engaged with the face teeth 44 of the gear 20, the gear 20 is coupled to the output shaft 16, thus coupling the output shaft to the input shaft 14 via a reduction gear train formed by the gears 18, 22, 24 and 20. In FIG. 1 the shifter clutch member 34 is shown in the neutral position; that is, the output shaft 16 is decoupled from the input shaft 14.

Figure 5:
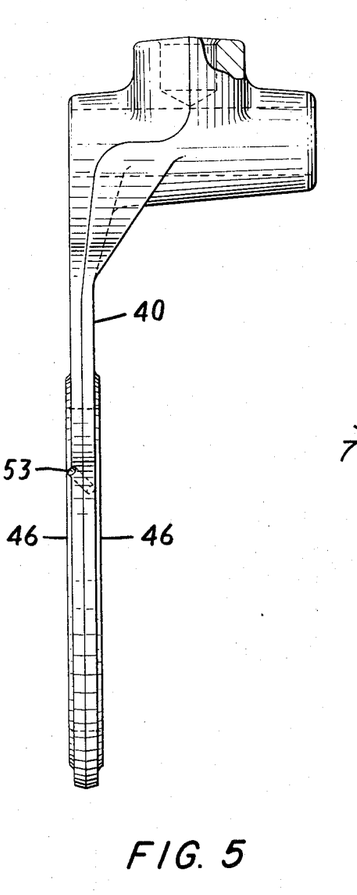
FIG. 5 is a side elevational view of the shifter element employed in the apparatus of FIG. 1.
Figure 6:
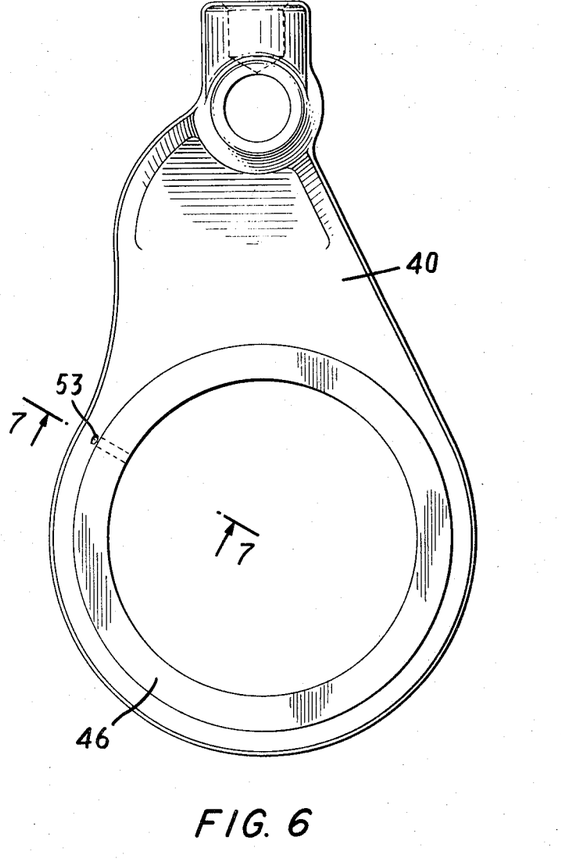
FIG. 6 is a front elevational view of the shifter element of FIG. 5.

As is best illustrated in FIGS. 5 and 6, the shifter element 40 is provided with a pair of continuous, lateral surfaces 46 for applying force to a pair of corresponding continuous, lateral surfaces 48 on the shifter clutch member 34. These unbroken pairs of lateral surfaces permit the smooth application of force against the shifter clutch member 34 in each direction through the intermediary of a plurality of needle roller bearings 50 arranged in a circular cage 52, separately illustrated in FIGS. 8 and 9. The bearing cage 52 is formed of two ring-shaped pieces of sheet metal, preferably stainless steel, which are pressed together and crimped at their inner circumference to prevent disengagement. Windows in the sheet metal pieces, cut slightly narrower in width than the needle bearings 50, permit the needle bearing surfaces to extend beyond the lateral walls of the cage while preventing their dislodgement.

The full circle contact of the needle roller bearings 50 with the lateral engaging surfaces 46 of the shifter element 40 and the lateral engaging surfaces 48 of the shifter clutch member 34 reduces vibration when the face teeth of the shifter clutch member are brought into non-meshing contact with the face teeth of one of the gears 18 and 20. In addition, the use of the needle bearings 50 disposed between a pair of a continuous running surfaces reduces wear and heat generated due to friction and reduces the unit load on the clutch member 34 and the shifter 40, resulting in extended life of the clutch assembly.

Figure 7:
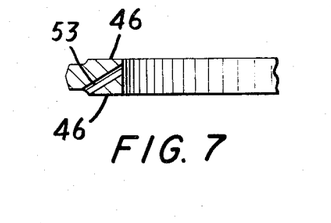
FIG. 7 is a view taken along the line 7—7 of FIG. 6, looking in the direction of the arrows.
Figures 8, 9:
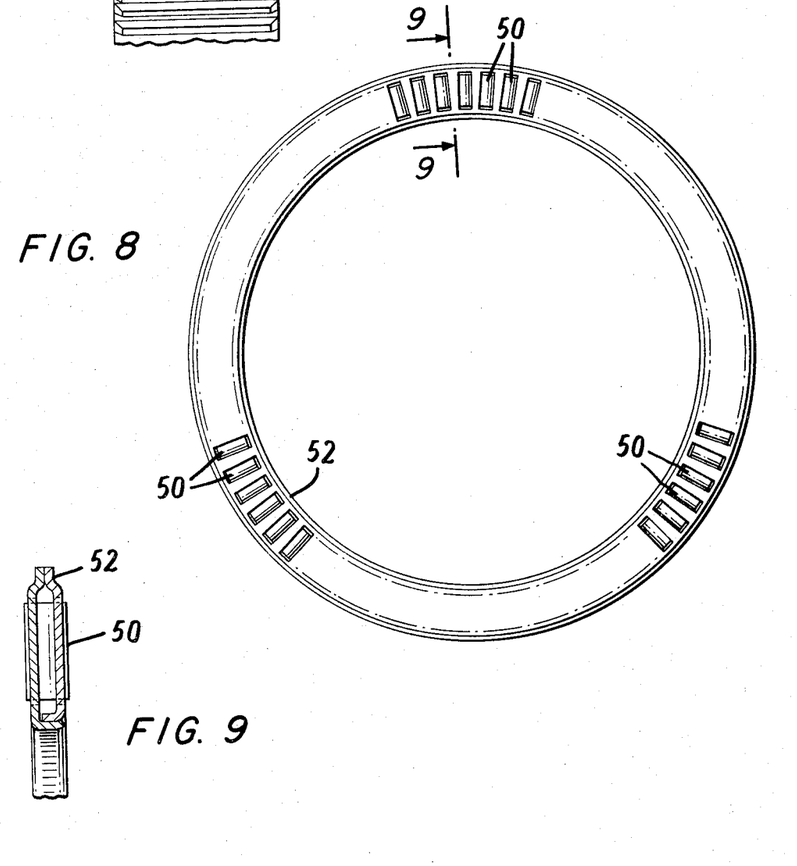
FIG. 8 is an enlarged front elevational view of one of the needle roller bearing units employed in the apparatus of FIG. 1.
FIG. 9 is a view taken along the line 9—9 of FIG. 8, looking in the direction of the arrows.

Lubrication for the engaging surfaces 46 and 48 and the needle roller bearings 50 is provided by splash from the transmission sump and is further directed to the bearings by an oil hole 53 in the shifter element 40, as is best illustrated in FIG. 7.

The shifter element 40 is driven by a fluid-actuated piston 54 through an arm 55 secured thereto, the arm 55 engaging the shifter element. Any conventional hydraulic or pneumatic system may be employed to apply a shifting force to the shifter element. The shifter element 40 slides on a rail 56 secured to the transmission housing 30, the rail 56 being bored at 57 to receive one end of a shift rail 58, which is associated with the section of the transmission including the shaft 14 and the countershaft 33.

Figure 2:
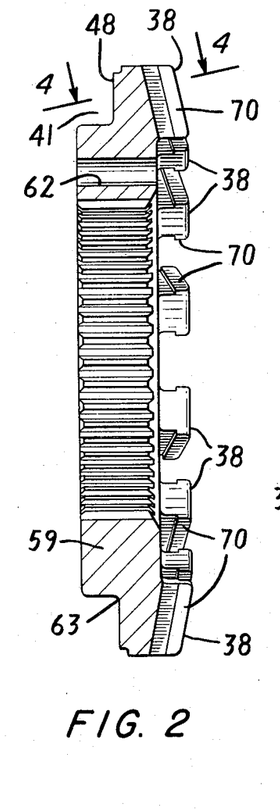
FIG. 2 is an enlarged sectional view of a portion of the shifter clutch member employed in the apparatus of FIG. 1.
Figure 3:
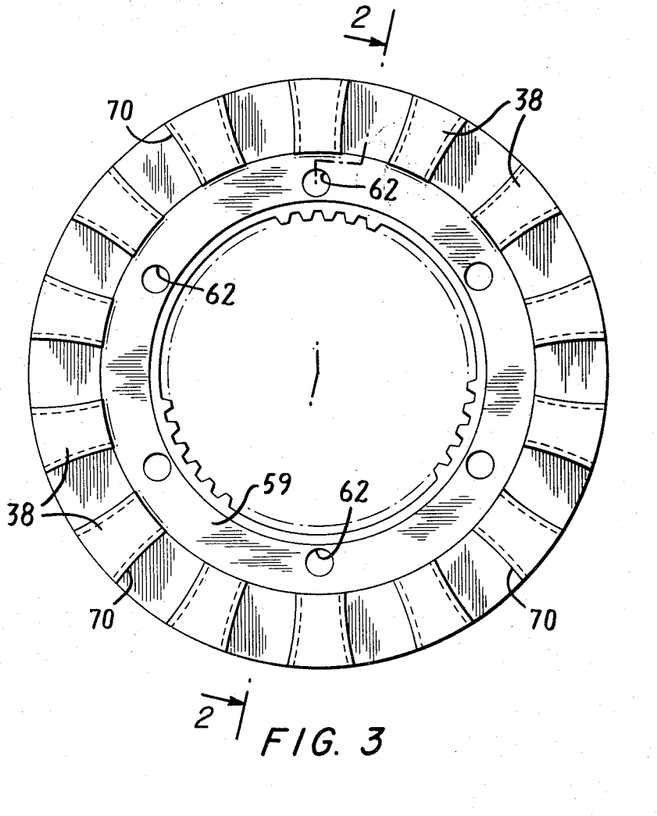
FIG. 3 is a front elevational view of the shifter clutch member of FIG. 2.

In the embodiment illustrated in FIG. 1, the full circle shifter element 40 and the needle bearing cages 52 containing the needle roller bearings 50 are inserted in the groove 41 of the shifter clutch member 34 during assembly by constructing the clutch member of two identical halves 59 and 60 and bolting these halves together, on opposite sides of the shifter element 40 and the needle roller bearings, with a plurality of bolts 61. As shown in FIGS. 2 and 3, the clutch member halves are provided with a plurality of axially extending bolt holes 62 equally spaced around the internal splines.

The groove 41 for the shifter element 40 is formed by an L-shaped recess 63 in each clutch member half at its outer edge remote from the face teeth. The radially extending legs of these L-shaped recesses thus form the engaging surfaces 48 for the needle roller bearings 50.

Figure 10:
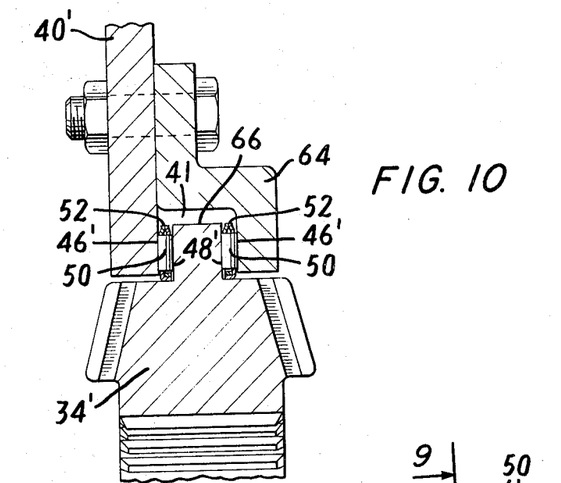
FIG. 10 is a sectional view of a portion of shifter clutch member and a shifter element according to an alternative preferred embodiment of the present invention.

An alternative embodiment of the shifter clutch member and the full circle shifter element is illustrated in FIG. 10. In this embodiment the shifter clutch member 34' is formed as a single piece while the shifter element 40' is provided with a ring-shaped attachment 64 which may be bolted on during assembly. When assembled, the shifter element 40' and the attachment 64 provide two spaced and continuous, lateral engaging surface 46' which cooperate with the engaging surfaces 48' of the shifter clutch member 34' to move the clutch member when effecting the shift. In this embodiment the engaging surfaces 48' are formed on a projection 66 extending around the outer periphery of the shifter clutch member 34'. The needle bearing cages 52 with the needle roller bearings 50 are disposed between the engaging surfaces 46' and 48' in the same manner as in the embodiment of FIG. 1.

Figure 4:
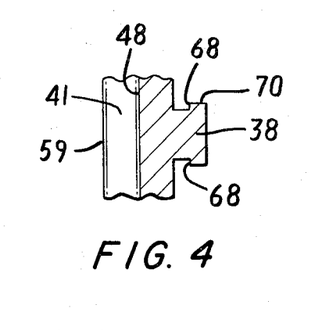
FIG. 4 is a view taken along the line 4—4 of FIG. 2, looking in the direction of the arrows, showing one of the teeth of the shifter clutch member.

Reference will now be made to FIGS. 2–4 of the drawings, showing different views of the face teeth 38. It will be understood that the face teeth 36 on the opposite side of the shifter clutch member 34 will be identical to the face teeth 38, and the face teeth 42 and 44 of the gears 18 and 20, respectively, will be complementary. In particular, since the face teeth 36 and 38 are of the curvic type, with the lateral edges of these teeth having a concave curvature corresponding to the radius of the tooth cutter, the face teeth 42 and 44 will also be curvic with their lateral edges having the same radius of curvature, but in the convex sense.

In accordance with a particular feature of the present invention, the shifter clutch member 34 (and 34') and the gears 18 and 20 are provided with face teeth having conical engaging surfaces and a T-shaped cross-section.

The conical surface defined by the faces of the clutch teeth is best illustrated in FIGS. 2 and 3. Mating conical surfaces are provided on the face teeth of the gears 18 and 20. This conical design improves the centering, alignment and synchronization of the shifter clutch member during the clutching operation. In addition, it permits a larger surface area to be presented by the clutch teeth to the corresponding face teeth of the gears 18 and 20. This larger area decreases the unit pressure on the face teeth during engagement and reduces chipping, wear and other damage which can result in premature failure.

The T-shaped cross-section of the clutch teeth as well as the corresponding face teeth of the gears 18 and 20 is best illustrated in FIG. 4. A step 68, having a depth which is preferably in the range of 0.006 inch to 0.010 inch, is cut on both sides of the face teeth. These steps lock the shifter clutch member 34 in engagement with a gear as long as torque is being transmitted (either in a driving or coasting condition) and remain locked until a torque reversal occurs, even though a force is applied to the shifter clutch member in a direction which would disengage the shifter clutch member and the gear.

In addition to the above, it has been found that smoother, quieter shifting may be obtained by providing the proper backlash between the face teeth of the shifter clutch member 34 and the face teeth of the gears 18 and 20. By keeping the backlash to a minimum, preferably in the range of 0.010 inch to 0.025 inch between lateral edges 70 of mating T-shaped teeth, the teeth must be closely synchronized in speed before actual engagement can take place. As a result, there is less shock caused by inertia of rotating parts at the exact moment of engagement.

Finally, the flat-face construction of the face teeth on both the shifter clutch member 34 and the gears 18 and 20 reduces vibration and bouncing to a minimum when the shifter clutch member is shifted into the butting yet unsynchronized condtion. This provides for quieter operation of the clutch and reduces stresses on the engaging teeth.

In addition to the clutching arrangement described above, the transmission section shown in FIG. 1 includes a torque reversal arrangement which can provide a plurality of reverse speeds. This arrangement consists of a pinion gear 72 formed on the countershaft 26, a reverse gear 74 mounted for continuous engagement with the pinion gear 72, and an output gear 76, splined on the output shaft 16. The output gear 76 is axially movable on the shaft 16 for shifting into and out of engagement with the reverse gear 74. A conventional shifter fork 78 is arranged in a collar of the output gear 76 to effect the shift, the form 78 eing carried by a shift rail (not shown) which is parallel to the shift rail 58.

The torque reversal arrangement is driven by the countershaft 26 at a speed determined by the gear reduction in the forward part of the transmission (not shown). If, for example, the forward part of the transmission is operative to produce five forward speeds at the input shaft 14 - so that, with the high and low range section shown, the transmission has altogether ten forward speeds - the torque reversal arrangement can provide five speeds in reverse.

Before the output gear 76 may be shifted into engagement with the reverse gear 74, the shifter clutch member 34 must be shifted into its neutral position. To prevent accidental shifts which could damage the transmission, a conventional interlock mechanism (not shown) insures that the shifter element 40 is in the neutral position before the shifter fork 78 can be moved to engage the gears 74 and 76, and that the shifter fork 78 is in the disengaged position before the shifter element 40 can be moved to engage the shifter clutch member 34 with one of the gears 18 and 20.

The clutching arrangement shown in FIG. 1 may be operated in the following manner: Assume that the vehicle in which the transmission is mounted is standing still with the engine running. The driver of the vehicle disengages the vehicle clutch and flips a gear shift switch or lever into the "low range" position. This "range" switch or lever is preferably mounted on the main gear shift lever by which the other gear ratios are selected. The range switch or lever controls a pneumatic system which causes air, under pressure, to enter the pneumatic cylinder in the region to the left of the piston 54. The shifter element 40 and, in turn, the shifter clutch member 34 are thereby moved to the right until the teeth 38 become engaged with the teeth 44 of the gear 20. If the faces of the teeth 38 and 44 abut against each other and driving engagement is not possible, the driver briefly engages the vehicle clutch causing the input shaft 14, and consequently also the gear 20, to rotate. The shifter element 40 maintains a force on the shifter clutch member 34 so that the latter will engage at the moment the teeth 38 and 44 are properly aligned.

After the shifter clutch member 34 is coupled to the gear 20, the vehicle operator engages the vehicle clutch and accelerates the vehicle. The output shaft 16 is thereby driven at a reduced speed via the input shaft 14, the gears 18, 22, 24 and 20 and the shifter clutch member 34. So long as the vehicle is accelerating or decelerating, the T-shaped teeth 38 of the shifter clutch member 34 remain locked with the T-shaped teeth 44 of the gear 20 so that the shifter clutch member 34 cannot be disengaged.

When the vehicle operator wishes to shift gears, he moves the range switch or lever to the "high range" position. This action causes pressurized air to enter the pneumatic cylinder on the right side of the piston 54 (while venting the left side thereof), applying a force in the leftward direction to the shifter element 40 and the shifter clutch member 34. Due to the locking action of the face teeth 38 and 44, however, the shifter clutch member 34 remains engaged with the gear 20 until there is a torque reversal in the drive train, when the operator lifts his foot from the accelerator pedal, for example. When this occurs, the shifter clutch member 34 is moved to the left by the shifter element 40 until its face teeth 36 abut the face teeth 42 of the gear 18.

Since the shifter clutch member 34 is initially out of synchronism with the gear 18, the face teeth 36 and 42 cannot engage. However, due to the flat-face construction of the abutting surfaces, the face teeth 36 and 42 slide smoothly against each other. The full circle shifter element 40 and the needle roller bearings 50 apply an evenly distributed force to the shifter element 34 to maintain the teeth 36 and 42 in continuous sliding contact until engagement is possible. The continuous running surfaces provided for the roller bearings 50 insure a smooth application of force on the shifter element 34 and minimize noise, vibration and wear of the clutching components. At the moment of substantial synchronism, the teeth 36 on the shifter clutch member 34 engage with the teeth 42 of the gear 18, completing the shift.

The clutching arrangement according to the present invention may be employed with any type of transmission, be it manual, semi-automatic or fully automatic. However, this clutching arrangement is particularly useful when employed with a semi-automatic transmission of the type illustrated in FIG. 1. In this transmission, the vehicle driver can pre-select the gear ratio desired and then complete the shift, without disengaging the vehicle clutch, by effecting a torque reversal in the drive train.

The clutching arrangement according to the present invention is also not limited to the specific high and low range gear configuration illustrated in FIG. 1. Rather this clutching arrangement may be employed wherever one rotating element, such as a gear or a shaft, must be clutched to another.

Accordingly, it will be understood that the present invention is susceptible to various modifications, changes and adaptations as will occur to those skilled in the art. It is therefore intended that the scope of the present invention be limited only by the following claims of their equivalents.

We claim:

1. In an automotive transmission having at least two gear ratios, apparatus for shifting gear ratios comprising, in combination:
   a. an input shaft;
   b. an output shaft arranged on a common axis with said input shaft;
   c. a countershaft arranged on a separate axis parallel to said input and output shafts;
   d. a first gear arranged for rotation about said common axis and coupled to said input shaft, said first gear having teeth on one side thereof;
   e. a second gear arranged for rotation about said separate axis and in meshing engagement with said first gear;
   f. a third gear arranged for rotation about said separate axis and coupled for rotation with said second gear;
   g. a fourth gear arranged for rotation about said common axis and in meshing engagement with said third gear, said fourth gear having teeth on the side thereof facing said first gear;
   h. a shifter clutch member arranged for rotation about said common axis between said first and fourth gear and coupled to said output shaft, said shifter clutch member having teeth on opposite sides thereof and being axially movable between a first terminal position in which its teeth on one side are in driving engagement with teeth of said first gear and a second terminal position in which its teeth on the opposite side are in driving engagement with the teeth of said fourth gear, the position midway between said first and second terminal positions being a neutral position in which its teeth on both sides are out of engagement, said shifter clutch member having an annular groove around its periphery, the sides of said groove forming two continuous, spaced, engaging, lateral surfaces extending generally perpendicular to said common axis, said shifter clutch member being constructed of two pieces such that one engaging, lateral surface thereof is formed by one piece and the other engaging, lateral surface thereof is formed by the other piece; and
   i. shifting means for moving said shifter clutch member in the axial direction between said first and second terminal positions, said shifting means including a single, integral, circular piece having two face sides forming two continuous, spaced, engaging, lateral surfaces, said circular piece being arranged in said annular groove with the engaging, lateral surfaces thereof in facing relation with the respective engaging, lateral surfaces of said shifter clutch member for applying a force to said respective lateral surfaces to move said shifter clutch member.

2. The shifting apparatus defined in claim 1, further comprising antifriction bearings arranged between said engaging, lateral surfaces of said shifter clutch member and said engaging, lateral surfaces of said shifting means.

3. The shifting apparatus defined in claim 2, wherein said antifriction bearings are needle roller bearings.

4. The shifting apparatus defined in claim 1, further comprising fluid-actuated control means for applying an axial force to said shifting means in a selected direction to shift said shifter clutch member.

5. The shifting apparatus defined in claim 1, wherein said teeth on the sides of said first and said fourth gear and the teeth on opposite sides of said shifter clutch member are face teeth.

6. The shifting apparatus defined in claim 5, wherein said face teeth of said first gear, said fourth gear and said shifter clutch member are conically shaped with their axis of revolution being said common axis.

7. The shifting apparatus defined in claim 1, wherein said two pieces of said shifter clutch member are identical.

8. In an automotive transmission having at least two gear ratios, apparatus for shifting gear ratios comprising, in combination:
   a. an input shaft;
   b. an output shaft arranged on a common axis with said input shaft;
   c. a countershaft arranged on a separate axis parallel to said input and output shafts;
   d. a first gear arranged for rotation about said common axis and coupled to said input shaft, said first gear having teeth on one side thereof;
   e. a second gear arranged for rotation about said separate axis and in meshing engagement with said first gear;
   f. a third gear arranged for rotation about said separate axis and coupled for rotation with said second gear;
   f. a third gear arranged for rotation about said separate axis and coupled for rotation with said second gear;
   g. a fourth gear arranged for rotation about said common axis and in meshing engagement with said third gear, said fourth gear having teeth on the side thereof facing said first gear;
   h. a shifter clutch member arranged for rotation about said common axis between said first and fourth gear and coupled to said output shaft, said shifter clutch member having teeth on opposite sides thereof and being axially movable between a first terminal position in which its teeth on one side are in driving engagement with the teeth of said first gear and a second terminal position in which its teeth on the opposite side are in driving engagement with the teeth of said fourth gear, the position midway between said first and second terminal positions being a neutral position in which its teeth on both sides are out of engagement, said shifter clutch member having an annular projection around its periphery, the sides of said projection forming two continuous, spaced, engaging, lateral surfaces extending generally perpendicular to said common axis, said shifter clutch member being formed of a single, integral piece; and
   i. shifting means for moving said shifter clutch member in the axial direction between said first and second terminal positions, said shifting means including a circular portion forming two continuous, spaced, engaging, lateral surfaces disposed on opposite sides of said projection in facing relation to respective ones of said lateral surfaces of said shifter clutch member for applying a force to said respective lateral surfaces to move said shifter clutch member, said circular portion being constructed of two pieces such that one engaging, lateral surface of the shifter means is formed by one piece and the other engaging, lateral surface of the shifter means is formed by the other piece.

9. In an automotive transmission having at least two gear ratios, apparatus for shifting gear ratios comprising, in combination:
 a. an input shaft;
 b. an output shaft arranged on a common axis with said input shaft;
 c. a countershaft arranged on a separate axis parallel to said input and output shafts;
 d. a first gear arranged for rotation about said common axis and coupled to said input shaft, said first gear having face teeth on one side thereof;
 e. a second gear arranged for rotation about said separate axis and in meshing engagement with said first gear;
 f. a third gear arranged for rotation about said separate axis and coupled for rotation with said second gear;
 g. a fourth gear arranged for rotation about said common axis and in meshing engagement with said third gear, said fourth gear having face teeth on the side thereof facing said first gear;
 h. a shifter clutch member arranged for rotation about said common axis between said first and fourth gear and coupled to said output shaft, said shifter clutch member having face teeth on opposite sides thereof and being axially movable between a first terminal position in which its face teeth on one side are in driving engagement with the face teeth of said first gear and a second terminal position in which its face teeth on the opposite side are in driving engagement with the face teeth of said fourth gear, the position midway between said first and second terminal positions being a neutral position in which its face teeth on both sides are out of engagement, said shifter clutch member also having two continuous, spaced, engaging, lateral surfaces extending generally perpendicular to said common axis, and said face teeth of said first gear, said fourth gear and said shifter clutch member having a "T"-shaped cross-section; and
 i. shifting means for moving said shifter clutch member in the axial direction between said first and second terminal positions, said shifting means having two continuous, spaced, engaging, lateral surfaces, each disposed in facing relation to a respective one of said lateral surfaces of said shifter clutch member for applying a force to said respective lateral surface to move said shifter clutch member.

10. In an automotive transmission having at least two gear ratios, apparatus for shifting gear ratios comprising, in combination:
 a. an input shaft;
 b. an output shaft arranged on a common axis with said input shaft;
 c. a countershaft arranged on a separate axis parallel to said input and output shafts;
 d. a first gear arranged for rotation about said common axis and coupled to said input shaft, said first gear having face teeth on one side thereof;
 e. a second gear arranged for rotation about said separate axis and in meshing engagement with said first gear;
 f. a third gear arranged for rotation about said separate axis and coupled for rotation with said second gear;
 g. a fourth gear arranged for rotation about said common axis and in meshing engagement with said third gear, said fourth gear having face teeth on the side thereof facing said first gear;
 h. a shifter clutch member arranged for rotation about said common axis between said first and fourth gear and coupled to said output shaft, said shifter clutch member having face teeth on opposite sides thereof and being axially movable between a first terminal position in which its face teeth on one side are in driving engagement with the face teeth of said first gear and a second terminal position in which its face teeth on the opposite side are in driving engagement with the face teeth of said fourth gear, the position midway between said first and second terminal positions being a neutral position in which its face teeth on both sides are out of engagement, said shifter clutch member also having two continuous, spaced, engaging, lateral surfaces extending generally perpendicular to said common axis, and said face teeth of said first gear, said fourth gear and said shifter clutch member being dimensioned to have an engaging clearance in the range of 0.010 inch to 0.025 inch, and
 i. shifting means for moving said shifter clutch member in the axial direction between said first and second terminal positions, said shifting means having two continuous, spaced, engaging, lateral surfaces, each disposed in facing relation to a respective one of said lateral surfaces of said shifter clutch member for applying a force to said respective lateral surface to move said said shifter clutch member.

11. In an automotive transmission having at least two gear ratios, apparatus for shifting gear ratios comprising, in combination:
 a. an input shaft;
 b. an output shaft arranged on a common axis with said input shaft;
 c. a countershaft arranged on a separate axis parallel to said input and output shafts;
 d. a first gear arranged for rotation about said common axis and coupled to said input shaft, said first gear having face teeth on one side thereof;
 e. a second gear arranged for rotation about said separate axis and in meshing engagement with said first gear;
 f. a third gear arranged for rotation about said separate axis and coupled for rotation with said second gear;
 g. a fourth gear arranged for rotation about said common axis and in meshing engagement with said third gear, said fourth gear having face teeth on the side thereof facing said first gear;
 h. a shifter clutch member arranged for rotation about said common axis between said first and fourth gear and coupled to said output shaft, said shifter clutch member having face teeth on opposite sides thereof and being axially movable between a first terminal position in which its face teeth on one side are in driving engagement with the face teeth of said first gear and a second terminal position in which its face teeth on the opposite side are in driving engagement with the face teeth of said fourth gear, the position midway between said first and second terminal positions being a neutral position in which its face teeth on both sides are out of engagement, said shifter clutch member also having two continuous, spaced, engaging, lateral surfaces extending generally perpendicular to said common axis, and said face teeth of said first gear, said fourth gear and said shifter clutch member having smooth, flat abutting face surfaces; and i. shifting means for moving said shifter clutch member in the axial direction between said first and second terminal positions, said shifting means having two continuous, spaced, engaging, lateral surfaces, each disposed in facing relation to a respective one of said lateral surfaces of said shifter clutch member for applying a force to said respective lateral surface to move said shifter clutch member.

* * * * *